W. H. SELLS & C. A. HOY.
MACHINE FOR REMOVING BUTT ENDS OF EARS OF CORN.
APPLICATION FILED APR. 15, 1916.
1,281,082.
Patented Oct. 8, 1918.
2 SHEETS—SHEET 2.
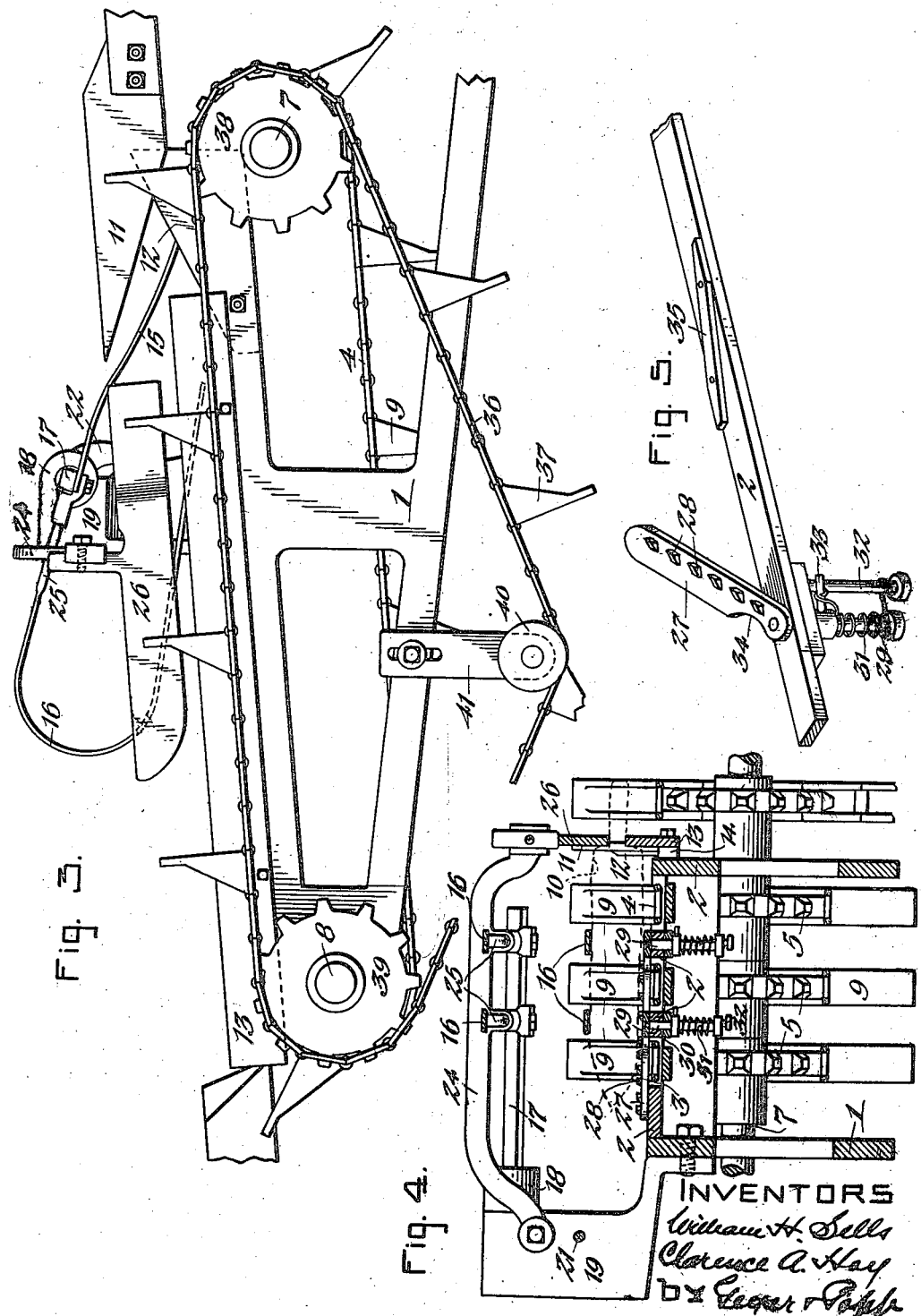

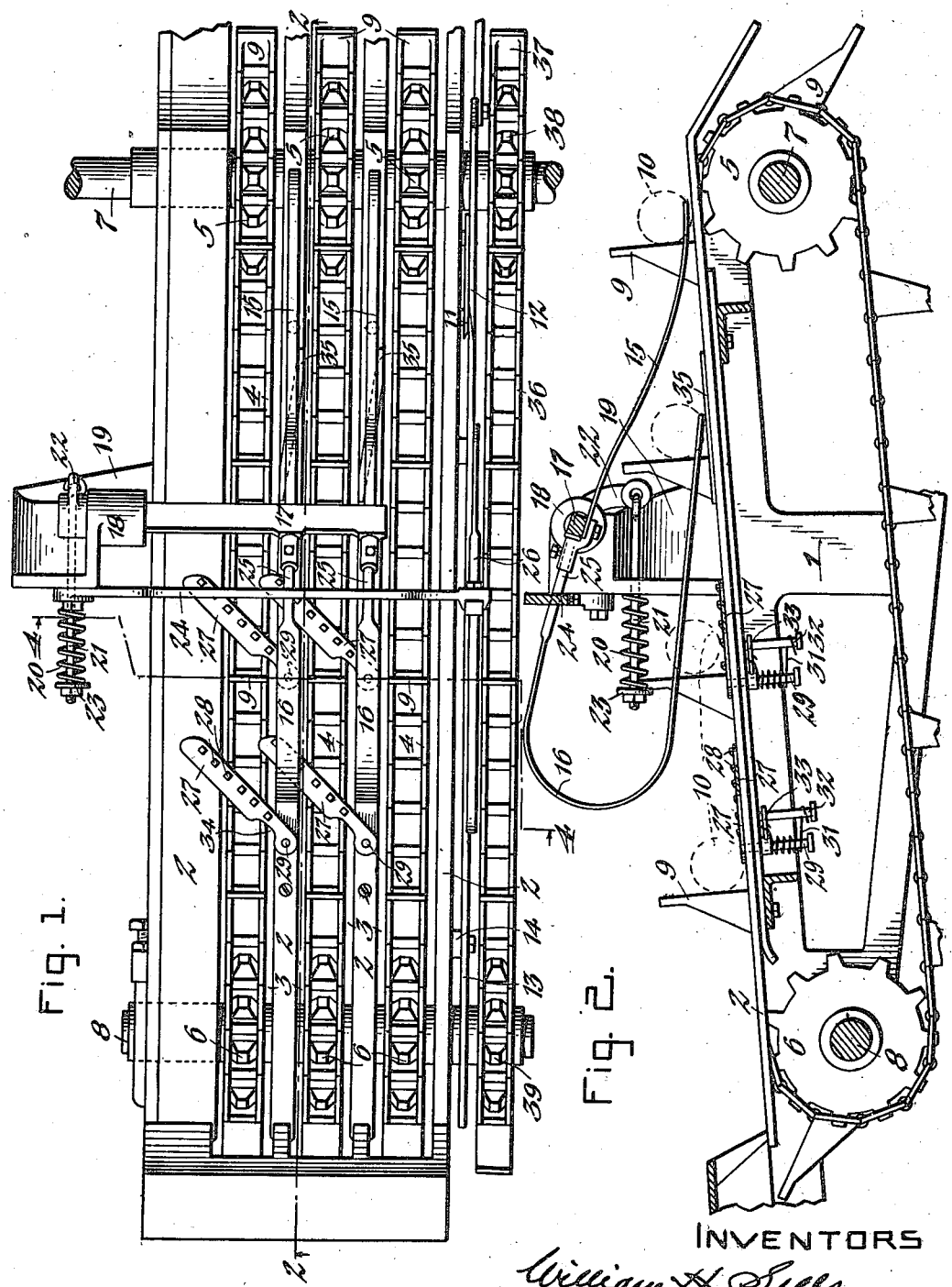

UNITED STATES PATENT OFFICE.

WILLIAM H. SELLS AND CLARENCE A. HOY, OF BUFFALO, NEW YORK, ASSIGNORS TO PEERLESS HUSKER COMPANY, A COPARTNERSHIP, OF BUFFALO, NEW YORK.

MACHINE FOR REMOVING BUTT-ENDS OF EARS OF CORN.

1,281,082.                   Specification of Letters Patent.         Patented Oct. 8, 1918.

Application filed April 15, 1916. Serial No. 91,338.

*To all whom it may concern:*

Be it known that we, WILLIAM H. SELLS and CLARENCE A. HOY, citizens of the United States, residing at Buffalo, in the county of Erie and State of New York, have invented new and useful Improvements in Machines for Removing Butt-Ends of Ears of Corn of which the following is a specification.

This invention relates generally to a machine for cutting off the butt ends of green ears of corn and particularly to the means for guiding or presenting the corn in a correct position preparatory to the removal of their butt ends.

The present invention is in the nature of an improvement upon Patent #1,077,577, granted to John B. Zimmerman and Ogden S. Sells, November 4, 1913, and the object of the same is to provide simple and efficient means whereby the above-mentioned purpose is accomplished.

Our invention has for a further object to provide means for carrying away the removed butt ends of corn, thereby preventing the latter from interfering with the working parts of the machine.

In the accompanying drawings:

Figure 1 is a fragmentary top plan view of a machine embodying our invention. Fig. 2 is a vertical longitudinal section taken on line 2—2, Fig. 1. Fig. 3 is a fragmentary side elevation of the machine. Fig. 4 is a cross section of the same taken on line 4—4, Fig. 1. Fig. 5 is a detached perspective view of one of the supporting bars of the machine having a shifting finger and rail whereby the ears of corn are moved toward the gage preparatory to cutting the butt ends thereof.

Similar characters of reference indicate corresponding parts throughout the several views.

Mounted on the frame 1 of the machine are a plurality of parallel longitudinal supporting bars 2 which are separated from each other by intervening longitudinal slots or openings 3. Passing through said slots are endless conveyer belts 4 adapted to engage front and rear sprocket wheels 5, 6, mounted on the shafts 7, 8, respectively, which are suitably journaled in bearings on the frame of the machine. Each of the conveyer belts is provided at suitable intervals with outwardly-projecting feed wings or flights 9 which are arranged transversely in line with the corresponding wings of the other belts, so as to carry the ears of corn 10 in a crosswise position forwardly over the feed table. Motion may be transmitted to the conveyer belts by applying power to the front shaft 7 by means of a pulley mounted thereon and receiving a driving belt.

The cutter which severs or removes the butt ends of the corn from the ears may be of any suitable construction, but as shown in the drawings, comprises upper and lower blades 11, 12 arranged lengthwise of the main frame and to the right of the conveyer, the cutting edges of said blades forming a V-shaped notch.

In order to predetermine the length of the butt to be cut from the ear of corn a suitable gage 13, preferably in the form of a longitudinal bar, is provided which is supported upon the frame 1 by means of brackets 14. As shown in the drawings, this gage is arranged adjacent to the cutter and parallel with the feed table of the machine and to the right of the conveyer. Said gage extends practically throughout the length of the conveyer and feed table but stops short of the point of intersection of the cutter blades 11, 12.

To retain the ears of corn in as firm a position as possible while being carried by the conveyer belt, suitable spring presser arms 15, 16 are provided which extend toward the front end of the machine. These presser arms are secured to a rock shaft 17 which is journaled in a bearing 18 of the bracket 19 and yieldingly turned downwardly toward the feed table by means of a coil spring 20 surrounding a tension rod 21 connected at one end to the depending arm 22 of said rock shaft, the spring bearing at one end against said bracket and at the other end against a stop washer 23. The rear presser arms 16 are preferably U-shaped, while the front presser arms 15 are slightly curved, as shown, and project somewhat in advance of the lower portions of said first-named arms and thereby hold the ear of corn firmly against the conveyer belt while its butt is being severed from the ear.

Coöperating with the rear presser arm 16 is a vertically movable rock lever 24 pivoted to the rear side of the bracket 19. This rock lever is provided with suitable openings through which the shanks 25 of the rear presser arms are adapted to pass and thereby transmit vertical motion to said lever when the shaft 17 is rocked by means of the corn coming in contact with the presser arms and raising the latter. Secured to the free end of said rock lever is a guide, holding plate or bar 26 which is arranged above and parallel with the gage 13 and adapted to engage the stalk of the ear of corn while the same is being propelled by the conveyer belts for a purpose hereinafter described. The lower bar 13 and the upper bar 26 in effect form sections of the gage mechanism which are separated by an intervening longitudinal slot through which the stub of the ear of corn projects while the butt bears against the inner sides of said bars 13, 26.

Each ear of corn is placed crosswise upon the rear end of the feed table, either manually or mechanically, so that the butt end of the ear is at the right or projecting toward that side of the conveyer on which the gage and cutter members are located. The ear is then engaged by the wings of the conveyer and propelled forwardly over the table in an obvious manner. During its forward movement over the feed table, the corn is automatically shifted transversely of the conveyer against the gage 13, so that the stalk or stub of the ear of corn projects over the upper edge of the lower gage bar 13 and under the upper gage bar 26 and the breast of the butt engages the inner sides of these bars, as shown in Fig. 4. This transverse movement of the ears of corn is effected by one or more shifting fingers 27 arranged below the path of the ears of corn and adapted to engage with the undersides thereof. These fingers are provided with a plurality of upwardly-projecting teeth or spurs 28 which bite into the underside of the ear. Said shifting fingers are arranged to swing horizontally and transversely over the feed table and are normally held in a position oblique to the line of travel of the conveyer and therefore in the path of the feed wings of said conveyer, as shown in Fig. 1. Any suitable means may be employed for retaining the shifting fingers in an oblique position relative to the conveyer, but the construction shown in the drawings is preferred. Each of the shifting fingers 27 is rigidly fastened at its rear end to a pivot pin 29 passing through and journaled in a bearing opening 30 in the supporting bar 2, so as to be capable of rotating therein. In its normal or inoperative position, each shifting finger is retained in its oblique position as regards the bars 2, by means of a coil spring 31, surrounding the lower portion of the pin 29, and arranged so that its lower end engages a stop pin 32 depending from said supporting bar, while its upper end engages a lug or projection 33 extending outwardly from that part of the pivot pin 29 adjacent the underside of the supporting bar, said stop pin arresting the rearward movement of the finger 27 in an obvious manner. Each shifting finger is swung inwardly or to the right toward the gage bars 13 and 26 in the operation of moving the ears transversely of the feed table by means of the lower portions of the feed wings 9 of the conveyer belt engaging or striking the recessed or cut away portion 34 of said finger. Upon striking the recessed portion of the shifting finger, the feed wing causes the latter to be quickly and suddenly swung toward the gage to a position substantially parallel with the conveyer. The finger remains in this last-mentioned position until the feed wing has cleared the free outer edge thereof, at which time it will return to the oblique position under the tension of the spring 31. It will thus be seen that when the underside of the ear of corn comes in contact with the sharp teeth of the shifting fingers it will be quickly moved transversely of the feed table until the butt ends engage the side gage while the projecting stalk or stud thereof will pass between the upper and lower sections of the gage, thereby preventing displacement of the same and placing the ear of corn in the correct position for trimming. As shown in the drawings, two of such shifting fingers are arranged on each of the two intermediate supporting bars 2 of the feed table and are so spaced that the front end of the rear finger will clear the adjacent end of the front finger when the former is swung inwardly.

Arranged in front of the foremost set of shifting fingers are a set of oblique shifting rails 35 which act to retain the ears of corn in a direction crosswise of the table and conveyer and prevent the same from moving away from the gage. While the ears are being fed forward by the conveyer and laterally by the shifting fingers and rails, they are pressed downwardly by the presser arms 15, 16, so that the ears of corn remain reliably in engagement with the wings of the conveyer and said shifting members. After being so shifted the ears continue their longitudinal forward movement under the action of the conveyer so that the ears of corn are carried past the cutter and the butt ends severed therefrom, the severed portion corresponding to the distance which the gage is offset toward the right from the cutter.

After the butt ends of the corn have been severed by the cutter, they are carried by an endless discharge belt 36 having feed wings 37 which are arranged transversely in line with the corresponding wings of the several chain belts 4 and allowed to fall into a suitable receptacle for this purpose. As shown in Fig. 3 of the drawings, this belt passes around front and rear sprocket wheels 36, 39 mounted on the shafts 7, 8, respectively, and also around an idler 40 adjustably arranged on the bracket 41 secured to the frame 1. Besides carrying the severed butt ends, the wings of this belt retain the ears of corn in parallel relation with the wings of the other conveyer.

This improved means of automatically shifting the ears of corn laterally on the conveyer toward the gage for gaging the butt ends of the ears preparatory to their removal is very effective, reliable in operation and insures the proper positioning of the ear against the gage at all times. Furthermore, this device is simple in construction, and can be readily applied to present machines of this character without interfering with other parts thereof.

We claim as our invention:

1. In a machine of the character described, the combination with a cutter, of a gage, a conveyer having feed wings for moving ears of corn lengthwise of said gage, and rocking shifting means for moving the ears transversely toward said gage and normally retained in the path of said feed wings and adapted to be actuated thereby.

2. In a machine of the character described, the combination with a cutter, of a gage, a conveyer having feed wings for moving ears of corn lengthwise of said gage, rocking shifting fingers for moving the ears transversely toward said gage and normally standing in the path of said feed wings and adapted to be actuated positively thereby, and spring means for returning said shifting fingers to the normal position.

3. The combination of a table comprising a plurality of longitudinal supporting bars which are separated by intervening slots, a conveyer comprising belts movable forwardly through said slots and provided with feed wings for carrying ears of corn over said table in a crosswise position, a gage arranged lengthwise of the conveyer and table on one side thereof, a cutter arranged adjacent to said gage, means for shifting the ears of corn transversely of the conveyer and table comprising a plurality of movable shifting fingers arranged on said supporting bars and adapted to be actuated by the feed wings of said conveyer when in their normal position, means for returning said fingers to their normal position after being actuated by said feed wings, and yielding means for holding the ears of corn against said conveyer and gage during their travel.

WILLIAM H. SELLS.
CLARENCE A. HOY.